US007132813B2

(12) United States Patent
Gregori et al.

(10) Patent No.: US 7,132,813 B2
(45) Date of Patent: Nov. 7, 2006

(54) SYSTEM AND METHOD FOR ADAPTING TO BARRIER NUISANCES AND OBSTRUCTIONS

(75) Inventors: Eric Gregori, Lindenhurst, IL (US); Robert S. Study III, Arlington Heights, IL (US); Colin B. Willmott, Buffalo Grove, IL (US); Robert R. Keller, Jr., Chicago, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/876,325

(22) Filed: Jun. 24, 2004

(65) Prior Publication Data

US 2005/0285553 A1 Dec. 29, 2005

(51) Int. Cl.
G05B 11/56 (2006.01)
(52) U.S. Cl. .......................... 318/466; 318/468; 49/26; 49/27; 49/28
(58) Field of Classification Search ................ 318/466, 318/468; 49/26, 27, 28
See application file for complete search history.

(56) References Cited

U.S. PATENT DOCUMENTS

| 4,625,291 | A | * | 11/1986 | Hormann ..................... 702/41 |
| 5,412,297 | A | * | 5/1995 | Clark et al. ................. 318/468 |
| 5,747,956 | A | | 5/1998 | Lamm |
| 5,929,580 | A | * | 7/1999 | Mullet et al. ............... 318/466 |
| 6,051,945 | A | * | 4/2000 | Furukawa .................... 318/280 |
| 6,566,828 | B1 | * | 5/2003 | Fitzgibbon et al. ......... 318/283 |
| 6,667,591 | B1 | * | 12/2003 | Mullet et al. ............... 318/445 |
| 6,806,665 | B1 | * | 10/2004 | Fitzgibbon et al. ......... 318/282 |
| 6,870,334 | B1 | * | 3/2005 | Jurado et al. ............... 318/282 |
| 6,879,122 | B1 | * | 4/2005 | Stewart et al. ............. 318/280 |
| 6,897,630 | B1 | * | 5/2005 | Murray et al. ............. 318/434 |
| 2003/0025470 | A1 | * | 2/2003 | Fitzgibbon et al. .......... 318/66 |
| 2003/0038604 | A1 | | 2/2003 | Study et al. |
| 2004/0261317 | A1 | * | 12/2004 | Murray .......................... 49/26 |
| 2005/0082998 | A1 | * | 4/2005 | Gregori et al. ............. 318/280 |
| 2005/0156547 | A1 | * | 7/2005 | Gregori ....................... 318/282 |
| 2005/0285553 | A1 | * | 12/2005 | Gregori et al. ............. 318/280 |

* cited by examiner

*Primary Examiner*—Lincoln Donovan
*Assistant Examiner*—Robert W. Horn
(74) *Attorney, Agent, or Firm*—Fitch, Even, Tabin & Flannery

(57) ABSTRACT

A barrier movement operator moves a barrier between open and closed positions. The operator receives a first request to move the barrier. The actual force required to move the barrier is measured. An obstruction to barrier movement is determined by comparing the measured actual force to a first predetermined force threshold. Responsive to the detection of an obstruction, the direction of travel of the barrier is reversed. The operation of the barrier movement operator is modified, by permitting the use of a higher force threshold in future measurements. A second request to move the barrier is received. The actual force required to move the barrier is measured a second time. An obstruction to barrier movement is detected by comparing the measured actual force with the new, higher force threshold.

29 Claims, 6 Drawing Sheets

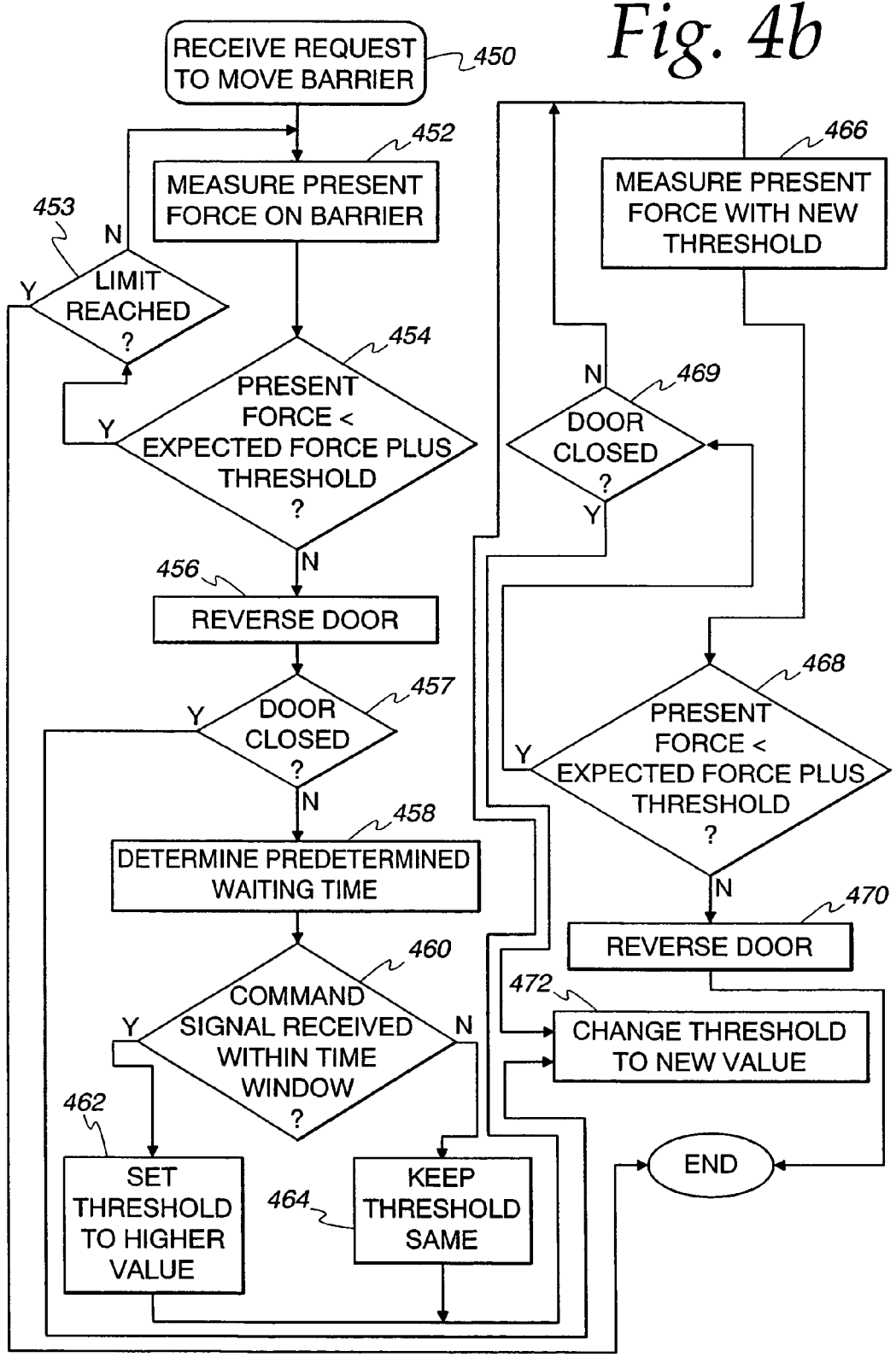

SYSTEM AND METHOD FOR ADAPTING TO BARRIER NUISANCES AND OBSTRUCTIONS

FIELD

The field of the invention generally relates to methods and devices for controlling moveable barrier operators. More particularly, the invention relates to adapting the operation of the barrier to detect and overcome nuisance obstructions.

BACKGROUND

Barrier movement operators are automated systems which are used to move a barrier with respect to an opening. Examples of the barriers to be moved include garage doors, gates, fire doors and rolling shutters. The primary examples herein involve garage door operators but the principles described and claimed therein relate to all barrier movement operators. A number of barrier movement operators have been sold over the years most of which include a head unit containing a motor connected to a transmission. The transmission, which may include, for example, a belt drive, a chain drive, a screw drive or extendible arm is then coupled to the barrier for opening and closing.

Such barrier movement operators also typically include a wall control unit, which is connected to send signals to the head unit thereby causing the head unit to open and close the barrier. In addition, these operators often include a receiver unit at the head unit to receive wireless transmissions from a hand-held code transmitter or from a keypad transmitter, which maybe affixed to the outside of the area closed by the barrier or other structure.

As barrier movement operators open and close the barriers, the barrier may come into contact with an obstruction. Previous systems have allowed the barrier operator systems to determine if an obstruction has been encountered and to either stop or reverse the direction of the travel of the barrier once this determination has been made. For instance, some previous systems measured the force applied to the barrier by the motor. The systems then compared the measured force to an expected value plus a fixed cushion value. If the comparison indicated that the measurement value exceeded the expected value plus the cushion value (together, a threshold value), then the downward barrier movement was reversed. These systems typically determined the force by measuring the barrier speed or current in the motor and then calculated the force using these measurements.

Secondary obstruction detectors have also been used to detect obstructions in the path of the barrier. For instance, infrared (IR) detectors and barrier edge sensors have been used to determine if an obstruction exists in the path of the barrier. Typically, if the secondary obstruction detector indicated that an obstruction was present, the downward movement of the barrier was halted and then reversed in previous systems.

As system components age and are subjected to various environmental conditions and the system is not properly maintained, errors in the operation of previous systems may occur. For instance, if force measurements are made, the measured force may exceed the threshold value, but the door may not be encountering a real obstruction. In this case, the downward movement of the door would be reversed even though there was no actual obstruction present in the path of the barrier. For example, a nuisance such as sand or dirt maybe present in the guiding apparatus of the door path. In other examples, the door may have not been lubricated or may have worn parts. In summary, present systems are not capable of adapting their performance over time to determine if a real obstruction exists or whether the barrier reversal was caused by a nuisance or mistake.

SUMMARY OF THE INVENTION

The present invention is directed to a system and method for operating a barrier movement operator between open and closed positions. The system and method determines if an obstruction is truly present in the barrier and stops and potentially reverses the direction of travel if an obstruction is detected. The detection and determination is accomplished by measuring the force applied to the barrier and comparing this measured force to a threshold. After the direction of travel of the barrier is reversed, a request is made to move the barrier downward, the barrier is moved downward, and the force applied to the barrier is compared to a new, higher threshold. The request may be made by pressing and then releasing an actuator device such as a button or switch. The barrier travel direction may be reversed again if the second test indicates that the measured force exceeds the new threshold. If the barrier reaches the end of its path, it is determined that an obstruction did not really exist in the path of the barrier.

In many of the embodiments, a barrier movement operator moves a barrier between open and closed positions. The operator receives a first request to move the barrier. The force required to move the barrier is measured. Whether an obstruction to barrier movement exists is determined by comparing the measured actual force to a first predetermined force threshold. Responsive to the detection of an obstruction, the direction of travel of the barrier is stopped and potentially reversed. The operation of the barrier movement operator is modified, by permitting the use of a higher force threshold in future measurements and comparisons.

A second request to move the barrier is then received. The actual force required to move the barrier is measured a second time. An obstruction to barrier movement is detected by comparing the measured actual force with the new, higher force threshold.

The modification of the force threshold may be reversed upon completion of the barrier movement in response to the second request without detecting an obstruction. Alternatively, the new force threshold may be made permanent.

In other approaches, a user is allowed a predetermined time to make the second request for the barrier movement. If the request is received within the time period, the system may use a modified, new threshold value in the comparisons performed. If the request is not received within the specified time period, the system may use the old threshold in the comparisons. In still another approach, the system may also test for obstructions using secondary obstruction detectors such as IR sensors and use this information together with the threshold comparison to determine whether an obstruction exists.

Thus, a method and system to determine obstructions in the path of a barrier is adaptable to environmental and other conditions and changes in system components. In this regard, a new threshold is used to determine whether an actual obstruction exists in the path of the closing barrier or whether an alleged obstruction does not exist and the barrier can be safely closed.

BRIEF DESCRIPTION OF THE DRAWINGS

FIG. 4b is a flowchart illustrating the operation of the barrier opening system using a permanent threshold according to the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

For illustrative purposes, the following description refers to a moveable barrier that is a garage door. However, it will be understood by those skilled in the art that the moveable barrier may not only be a garage door but may be any type of barrier such as a fire door, shutter, window, gate. Other examples of barriers are possible.

Figure 1:
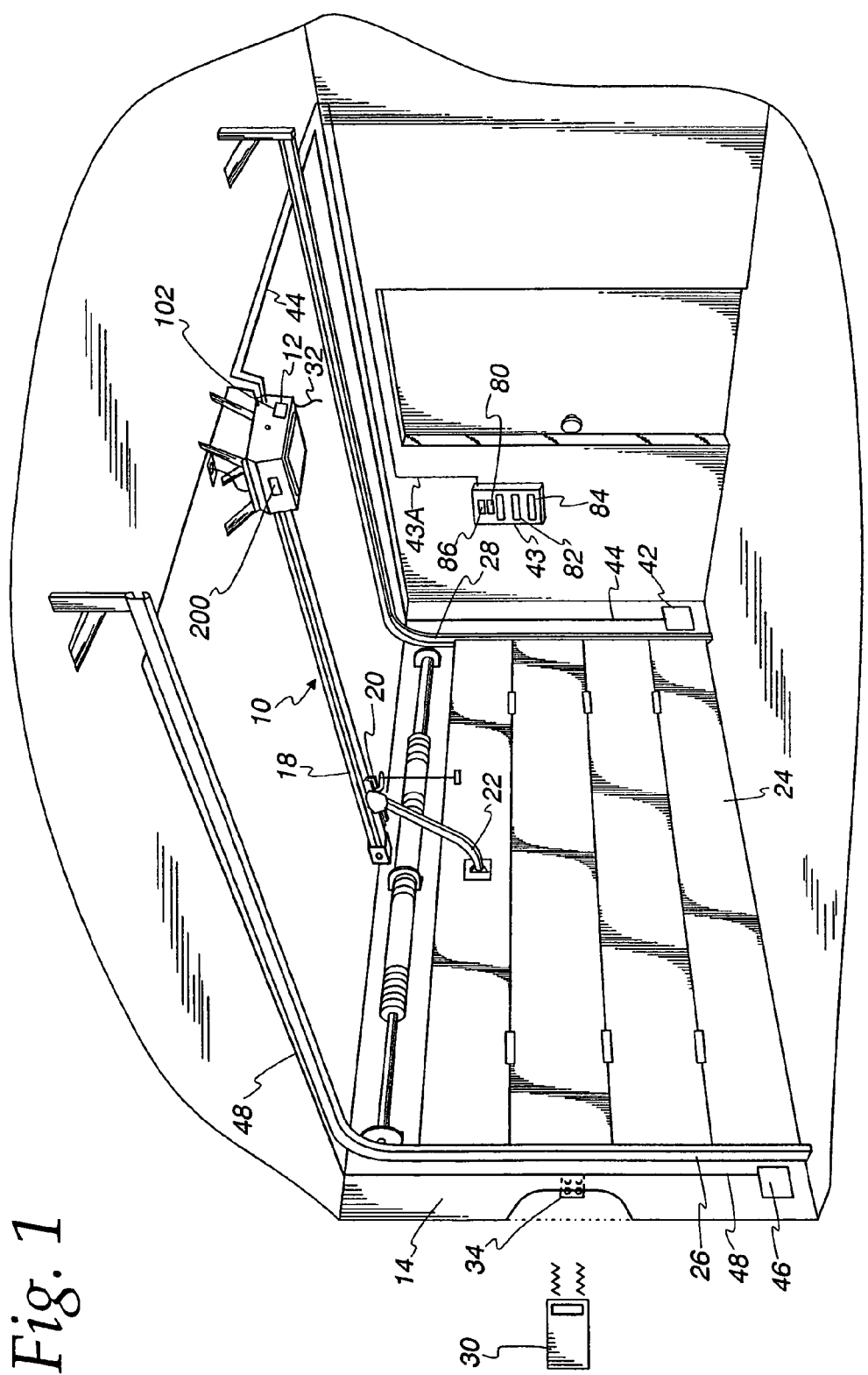
FIG. 1 is a perspective view of a garage door opening system according to the present invention.

Referring now to the drawings and especially to FIG. 1, a movable barrier operator, which is a garage door operator, is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 as will appear hereinafter. An external control pad 34 is positioned on the outside of the garage having a plurality of buttons thereon and communicates via radio frequency transmission with the antenna 32 of the head unit 12. An optical emitter 42 is connected via a power and signal line 44 to the head unit. An optical detector 46 is connected via a wire 48 to the head unit 12. The head unit 12 also includes a receiver unit 102. The receiver unit 102 receives a wireless signal, which is used to actuate the garage door opener.

The head unit 12 has the wall control panel 43 connected to it via a wire or line 43A. The wall control panel 43 includes a decoder, which decodes closures of a lock switch 80, a learn switch 82 and a command switch 84 in the wall circuit. The wall control panel 43 also includes a light emitting diode 86 connected by a resistor to the line 43 and to ground to indicate that the wall control panel 43 is energized by the head unit 12. Switch closures are decoded by the decoder, which sends signals along lines 43A to a control unit 200 coupled via control lines to an electric motor positioned within the head unit 12. In other embodiments, analog signals may be exchanged between wall control 43 and head unit 12.

The wall control panel 43 is placed in a position such that an operator can observe the garage door 24. In this respect, the control panel 43 may be in a fixed position. However, it may also be moveable as well. The wall control panel 43 may also use a wirelessly coupled connection to the head unit 12 instead of the wire 43A. As discussed below, control unit 200 of head unit 12 determines the applied force or a value representative of the applied force to the door 24 (both referred to herein as the "measured force") and compares this to an expected value plus a variable cushion value (together, the threshold value, which is variable). Based upon the results of the comparison, the direction of the door travel may be reversed. A user may then press and release an actuator device, for example, the command switch 84. The direction of travel of the door 24 is again be reversed and a new threshold can be used and compared to the measured force. The new threshold value may be a higher threshold value than the old threshold. However, in other circumstances, a lower threshold value may be used. The threshold value may be adjusted by altering the cushion value and recalculating the threshold or simply directly altering the threshold.

In one approach, a time limit is set for the actuator device to be actuated and the threshold is adjusted if the actuator device is actuated within the time limit. Otherwise, the threshold may remain unchanged.

Based upon the results of comparing the measured force to the new threshold, an obstruction may be detected, the door movement may be halted, and then reversed. Alternatively, the door 24 may travel to the end of its path indicating that an obstruction does not exist. In another approach and as described elsewhere in this specification, a secondary obstruction detector, for instance, sensor 46, maybe used in conjunction with a force measurement to determine whether an obstruction exists in the path of the door 24.

Figure 2:
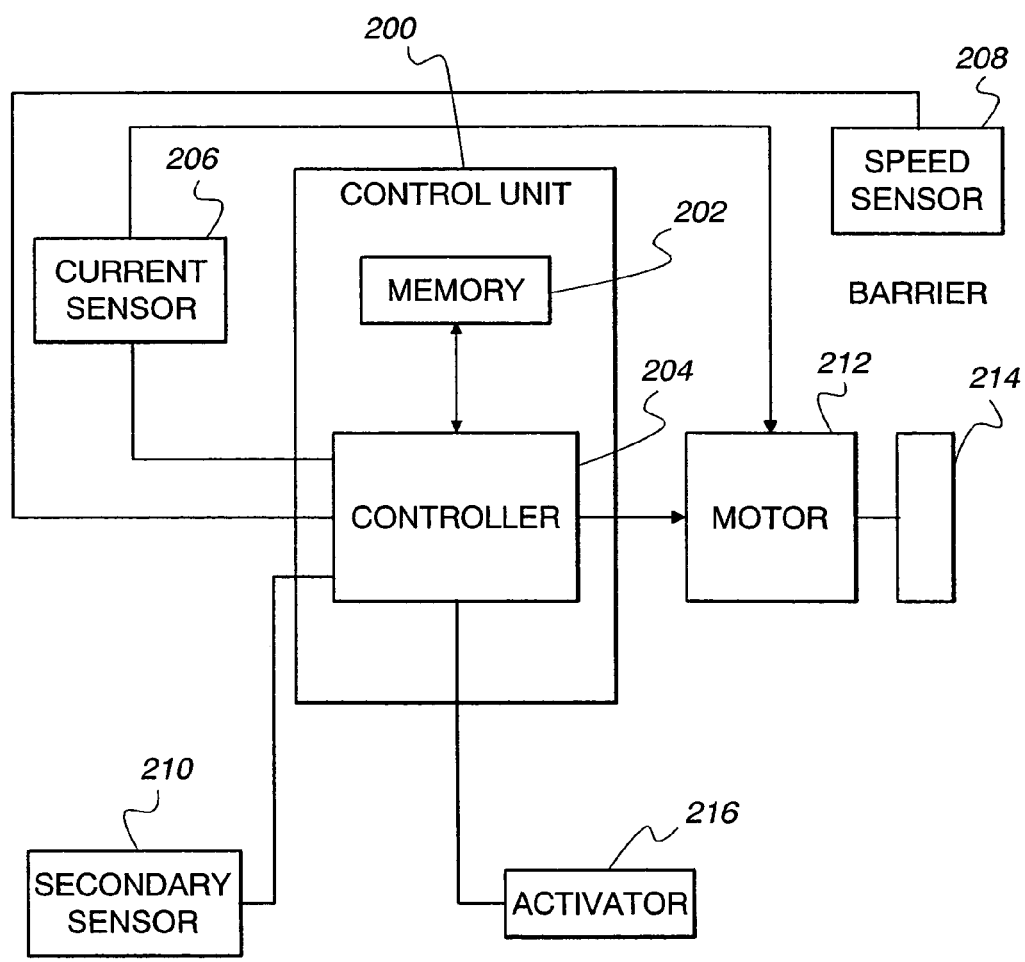
FIG. 2 is a block diagram of a controller for use in a barrier opening system according to the present invention.

Referring now to FIG. 2, an example of the control unit 200 is described. The control unit 200 includes a memory 202 and a controller 204. The controller 204 receives control signals from a current sensor 206 and a speed sensor 208. The current sensor 206 indicates the amount of electrical current that is present in a motor 212 of a moveable barrier operator. The speed sensor 208 indicates how quickly a door 214 is moving in a downward direction. The controller 204 receives these measurements from the sensors and from these measurements determines a value representing the amount of force being applied to the door 214.

As described elsewhere in this specification, the controller 204 compares the measured force to a threshold value. The measured force may be a value representative of force. For instance, it may be a speed of the motor or barrier or it may be the amount of current going to the motor sensed by the sensors. Alternatively, the system may actually calculate a force from these or other measurements. The expected force and threshold values are stored in the memory 202. As also explained elsewhere in the specification, the door 214 is initially moved in a downward direction. Upon exceeding the threshold value the controller will cause the door to stop and/or reverse its direction. In order to test and possibly clear the second obstruction the user momentarily presses and then releases an actuator 216 (switch 84) and the door 214 proceeds again in a downward direction and a new threshold may be used in comparison. If the new threshold value is exceeded, the direction of movement of the barrier is again reversed and it is determined that an obstruction existed in the path of the door 214. The new threshold may replace the old threshold in the memory 202 or the threshold may revert to the old threshold value.

A secondary obstruction detector 210 (optical emitter 42 and detector 46) may also be used. For example, the secondary detector 210 may be an IR detector, an optical motion detector, an acoustic motion detector, an RF motion detector, or a door edge detector. Other types of secondary obstruction detectors are possible.

The secondary obstruction detector 210 is used to verify the decision made by operator. In this regard, the controller 204 receives a signal from the secondary obstruction detector 210. If the detector 210 indicates that an obstruction exists and the operator insists on moving the door in a downward direction, then the old force threshold is used. In another example, the threshold will not be changed to a new threshold unless a secondary obstruction detector is being used and the secondary obstruction detector verifies that an obstruction exists. In this case, the threshold is changed and a verification can be performed indicating that both the secondary obstruction detector and the force comparisons indicate that an obstruction exists.

Figure 3A:
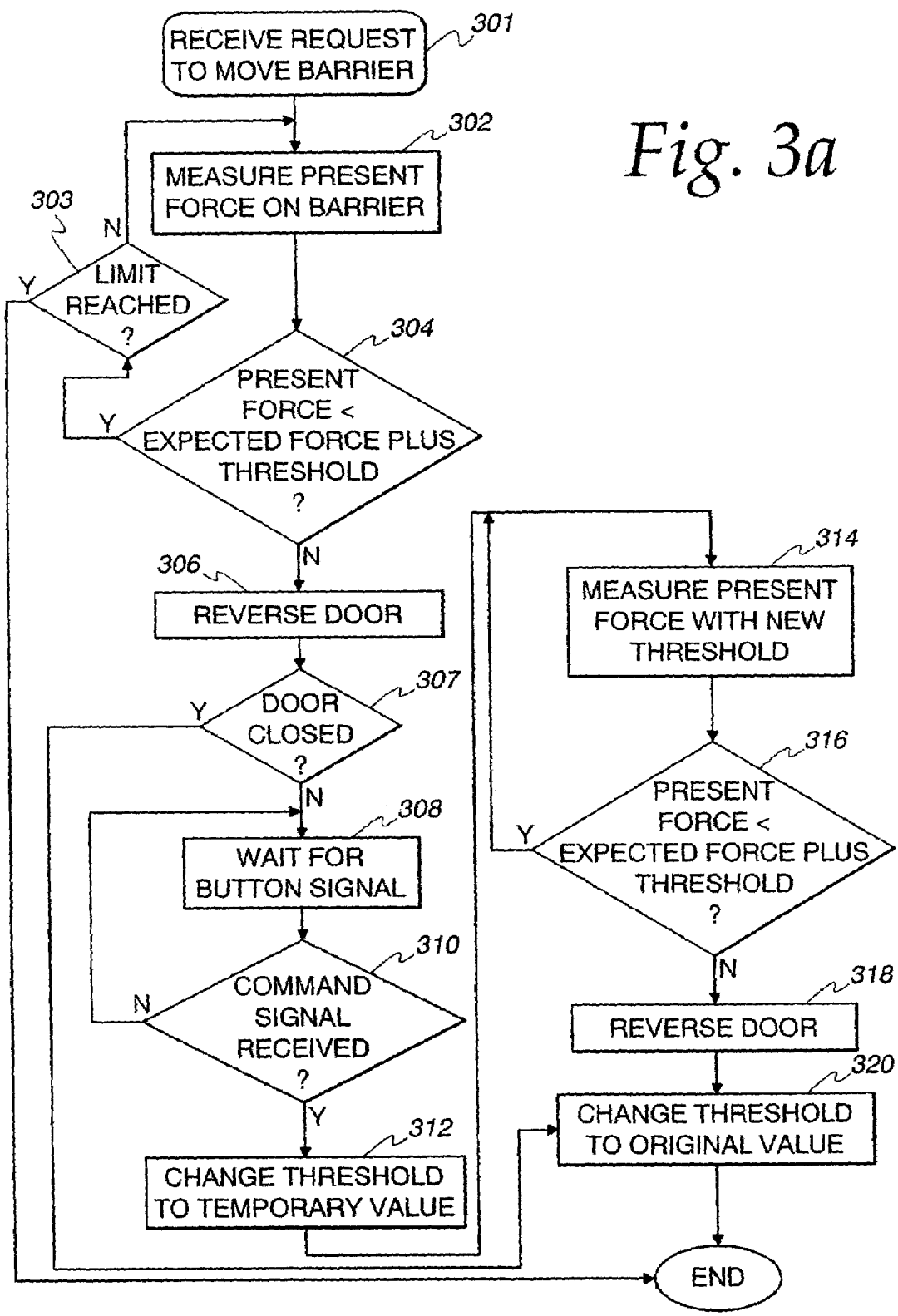
FIG. 3a is a flowchart illustrating the operation of the barrier opening system using a temporary threshold according to the present invention.

Referring now to FIG. 3a, an example of an approach that adjusts the force threshold is described. At step 302, the system measures the present force or value representing force being applied. The force or a value representing force may be determined by measuring several different system values. For instance, the system may measure the door speed by watching how fast markers (e.g. slits) move past a point or by measuring current in the motor. The speed or current representation is then used to calculate a value representing the force. At step 304, the system determines if the present measured force is less than a threshold value. If the answer at step 304 is affirmative, then execution continues at step 303. If the answer is negative at step 306, door movement in the downward direction is halted and movement of the door is reversed to an upward direction. At step 303, the system determines if limits were reached. If the answer is affirmative, execution ends. If the answer is negative, execution continues with step 302.

At step 307, it is determined whether the door has reached the closed position. If the answer is affirmative, control continues at step 320. If the answer is negative, control continues at step 308.

At step 308, the system waits for a control button to be actuated by a user. For example, the button may be a command button. At step 310, the system determines if the command signal created by the actuation of the button has been received. If the answer is negative, control returns to step 308. If the answer is affirmative, control continues at step 312 where the threshold is increased to a new value.

At step 314, the door is sent downward and the force being applied to the door is measured. At step 316, the system determines if the present measured force is less than the threshold value. If the answer is affirmative, control continues at step 314. If the answer is negative, control continues at step 318 where the direction of travel of the door is reversed. At this point, it can be determined that a valid obstruction has been detected. At step 320, the threshold is returned to the old threshold value.

Figure 3B:
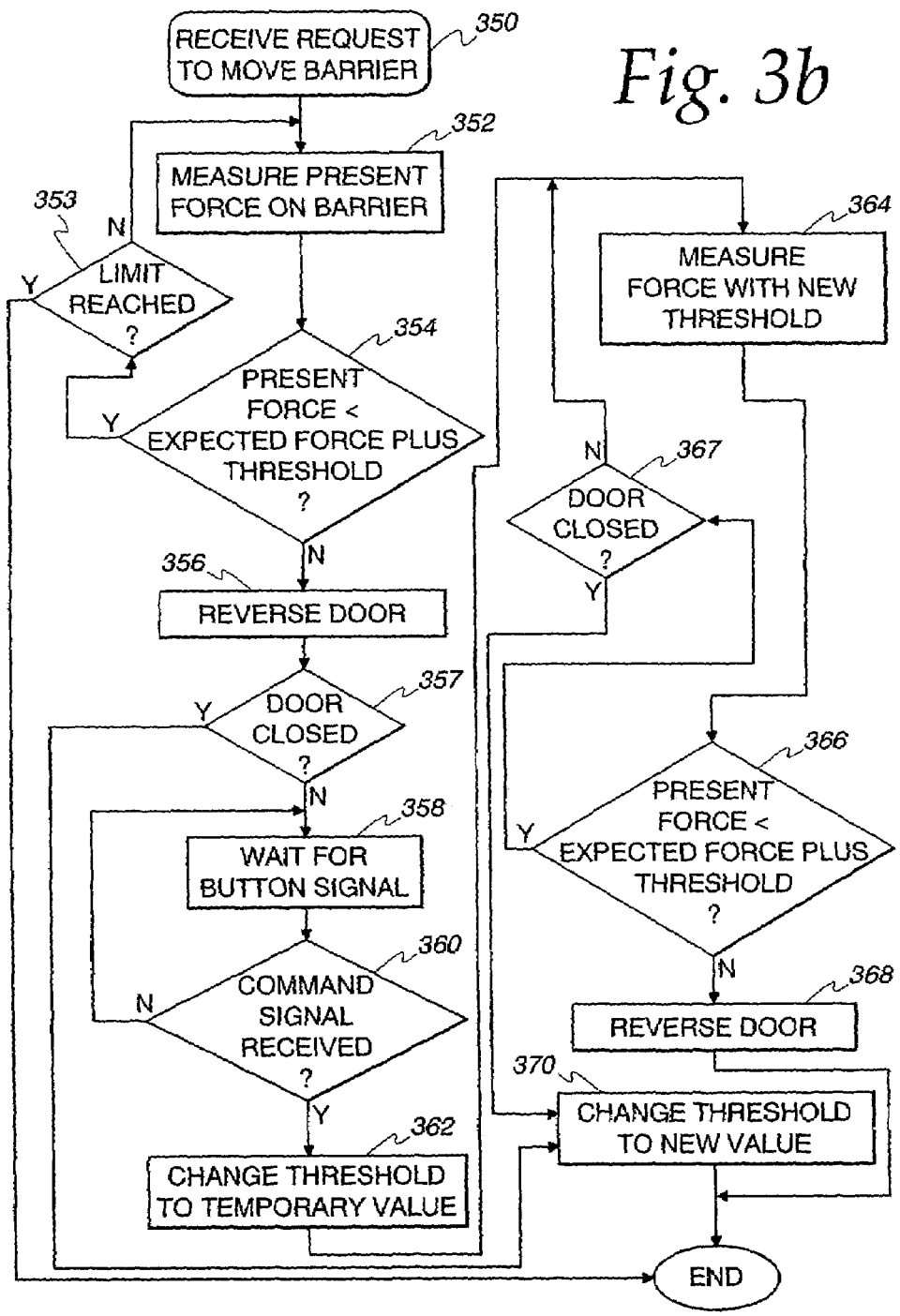
FIG. 3b is a flowchart illustrating the operation of the barrier opening system using a permanent threshold according to the present invention.

Referring now to FIG. 3b, an example of an approach that adjusts the force threshold and uses the new threshold as a permanent value is described. At step 352, the system measures the present force or a value representing force being applied. The force or value representing force may be determined by measuring several different system values. For instance, the system may measure the door speed by watching how fast markers (e.g. slits) move past a point or by measuring current in the motor. The speed (or current) is then used to calculate the force. At step 354, the system determines if the present measured force is less than a threshold value. If the answer at step 354 is affirmative, then execution continues at step 353. If the answer is negative at step 356, door movement in the downward direction is halted and movement of the door is reversed to an upward direction. At step 353, the system determines if limits were reached. If the answer is affirmative, execution ends. If the answer is negative, execution continues with step 352.

At step 357, it is determined whether the door has reached the closed position. If the answer is affirmative, control continues at step 370. If the answer is negative, control continues at step 358.

At step 358, the system waits for a control button to be actuated by a user. For example, the button may be a command button. At step 360, the system determines if the command signal created by the actuation of the button has been received. If the answer is negative, control returns to step 358. If the answer is affirmative, control continues at step 362 where the threshold is changed increased to a new temporary value. For instance, the system may increase the threshold value to a new higher value.

At step 364, the door is sent downward and the force being applied to the door is measured. At step 366, the system determines if the present measured force is less than the updated threshold. If the answer is affirmative, control continues at step 364. If the answer at step 366 is negative, control continues at step 368 where the direction of travel of the door is reversed. At this point, it can be determined that a valid obstruction has been detected. If the answer at step 366 is affirmative, control continues at step 367.

At step 367, it is determined whether the door has reached the closed position. If the answer is affirmative, control continues at step 370. If the answer at step 367 is negative, control continues at step 364. At step 370, the threshold is permanently changed to the new threshold value.

Figure 4A:
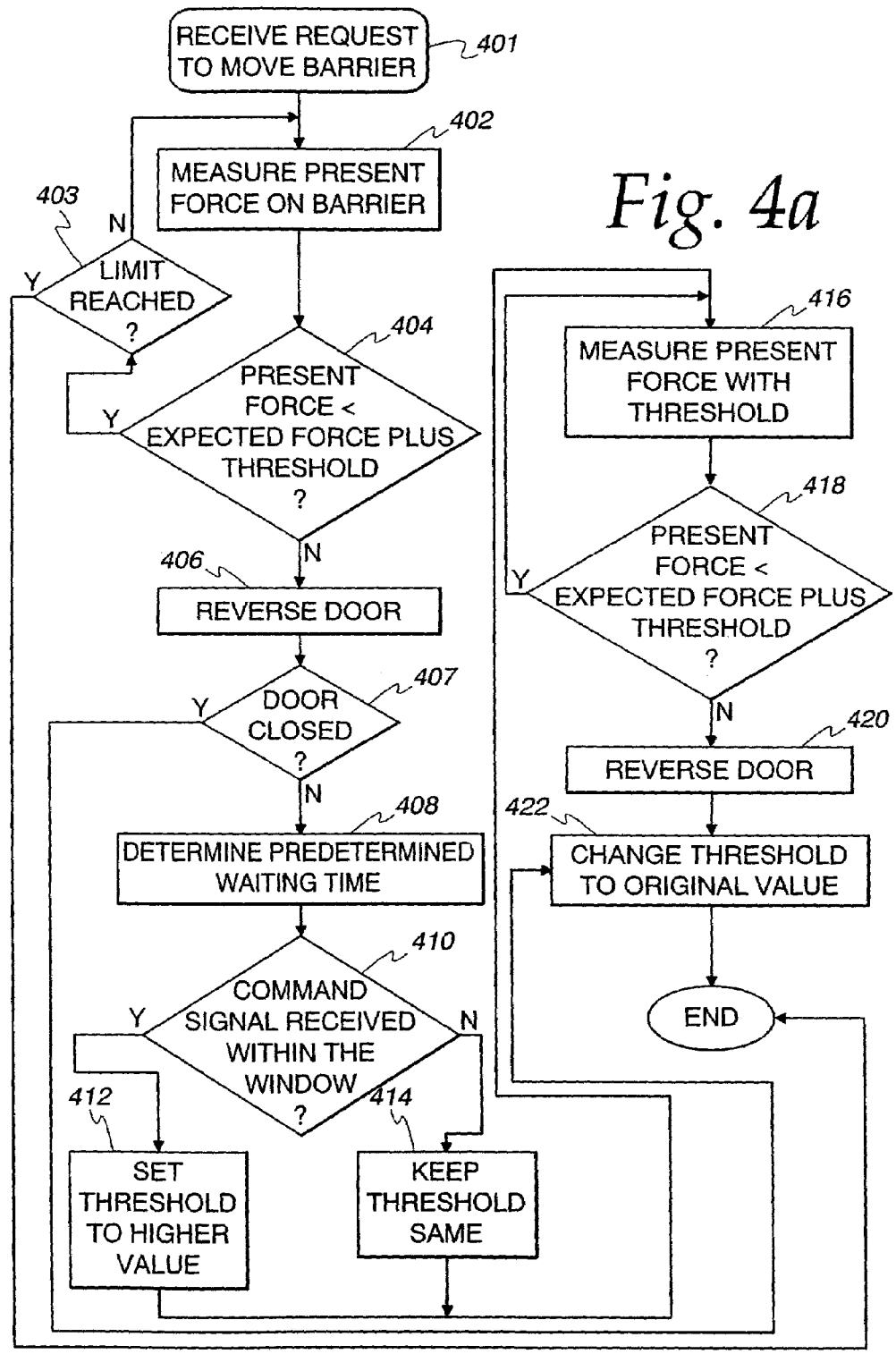
FIG. 4a is a flowchart illustrating the operation of the barrier opening system using a temporary threshold according to the present invention.

Referring now to FIG. 4a, an example of an approach that adjusts the force threshold is described. At step 402, the system measures the present force or a value representing force being applied. The force or the value representing force may be determined by measuring several different system values. For instance, the system may measure the door speed by watching how fast markers (e.g. slits) move past a point or by measuring current in the motor. The speed (or current) is then used to calculate the force. At step 404, the system determines if the present measured force is less than a threshold value. If the answer at step 404 is affirmative, then execution continues at step 403. At step 403, the system determines if limits were reached. If the answer is affirmative, execution ends. If the answer is negative, execution continues with step 402.

If the answer is negative at step 406, door movement in the downward direction is halted and movement of the door is reversed to an upward direction. At step 407, it is determined whether the door has reached the closed position. If the answer is affirmative, control continues at step 422. If the answer is negative, control continues at step 408.

At step 408, a predetermined waiting time is determined. This value maybe set by a user and it may be measured from the initial detection of an obstruction at step 404. At step 410, the system determines if the command signal created by the actuation of a command button has been received within the time window set at step 408. If the answer is negative, control returns to step 414 where the threshold value remains unchanged. If the answer is affirmative, control continues at step 412 where the threshold is changed or increased to a new temporary value. For instance, the system may increase the threshold value to a new higher value.

At step 416, the door is sent downward and the force being applied to the door is measured. At step 418, the system determines if the present measured force is less than the updated threshold (either a higher threshold or original threshold). If the answer is affirmative, control continues at step 416. If the answer is negative, control continues at step 420 where the direction of travel of the door is reversed. At this point, it can be determined that a valid obstruction has been detected. At step 422, the threshold is returned to the old threshold value.

Referring now to FIG. 4b, an example of an approach that adjusts the force threshold and uses the new threshold as a permanent value is described. At step 452, the system measures the present force or a value representing force being applied. The force or the value representing force may be determined by measuring several different system values. For instance, the system may measure the door speed by watching how fast markers (e.g. slits) move past a point or by measuring current in the motor. The speed (or current) is then used to calculate the force. At step 454, the system determines if the present measured force is less than a threshold value. If the answer at step 454 is affirmative, then execution continues at step 453. If the answer is negative at step 454, door movement in the downward direction is halted and movement of the door is reversed to an upward direction. At step 453, the system determines if limits were reached. If the answer is affirmative, execution ends. If the answer is negative, execution continues with step 452.

At step 457, it is determined whether the door has reached the closed position. If the answer is affirmative, control continues at step 472. If the answer is negative, control continues at step 458.

At step 458, a predetermined waiting time is determined. This value maybe set by a user and it may be measured from the initial detection of an obstruction at step 454. At step 460, the system determines if the command signal created by the actuation of a command button has been received within the time window set at step 458. If the answer is negative, control returns to step 464 where the threshold value remains unchanged. If the answer is affirmative, control continues at step 462 where the threshold is changed or increased to a new temporary value. For instance, the system may increase the threshold value to a new higher value.

At step 466, the door is sent downward and the force being applied to the door is measured. At step 468, the system determines if the present measured force is less than the updated threshold (either a higher threshold or original threshold). If the answer at step 468 is negative, control continues at step 470 where the direction of travel of the door is reversed. At this point, it can be determined that a valid obstruction has been detected. If the answer at step 468 is affirmative, control continues at step 469.

At step 469, it is determined whether the door has reached the closed position. If the answer is affirmative, control continues at step 472. If the answer at step 367 is negative, control continues at step 466. At step 472, the threshold is permanently changed to the new threshold value.

For the approaches described in FIGS. 3–4, a test may be made for a secondary obstruction detector may be made. If the test for the secondary obstruction detector indicates that the detector exists and is functioning correctly, then a new threshold maybe used as described above in relation to these figures. However, if the test indicates that a secondary obstruction detector is not being used, then no new threshold value is used. In this case, the test can be performed again to determine if an obstruction is still determined to exist. In another example, the secondary obstruction detector protects against human operator errors. If the secondary obstruction operator indicates than an obstruction exists, any forcing down of the door by the operator by pressing the control button will utilize the old threshold value. In other words, the new threshold value will not be used.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method of operating a barrier movement operator for moving a barrier between open and closed positions comprising:
   receiving a first request to move a barrier;
   first measuring the actual force required to move the barrier to detect an obstruction to barrier movement by comparing the measured actual force and a first predetermined force threshold;
   responsive to the detection of an obstruction, changing the travel of the barrier and modifying the operation of the barrier movement operator, by permitting the use of a higher force threshold in future measuring steps;
   receiving a second request to move the barrier;
   second measuring the actual force required to move the barrier to detect an obstruction to barrier movement by comparing the measured actual force with the higher force threshold; and
   reversing the modification of the force threshold upon completion of the barrier movement in response to the second request without detecting an obstruction.

2. A method in accordance with claim 1 wherein the movable barrier operator comprises a wire connected wall control and the step of receiving a second request to move the barrier comprises receiving the second request from the wire connected wall control.

3. A method in accordance with claim 1 wherein the movable barrier comprises a wire connected wall control and a wireless control and the step of receiving a second request to move the barrier comprises receiving a second request from either the wire connected wall control or the wireless control.

4. A method in accordance with claim 1 comprises ascertaining whether a secondary obstruction detector is present in the barrier movement operator and performing the modifying to permit the higher force threshold in response to the ascertaining step.

5. A method in accordance with claim 4 wherein the modifying is performed when the ascertaining step detects the presence of a secondary obstruction detector.

6. A method in accordance with claim 5 wherein the secondary obstruction detector comprises an optically responsive apparatus.

7. A method in accordance with claim 6 wherein the optically responsive device comprises an infrared beam device.

8. A method in accordance with claim 6 wherein the optically responsive detector comprises an optical motion detector.

9. A method in accordance with claim 5 wherein the secondary obstruction detector comprises an acoustic motion detector.

10. A method in accordance with claim 5 wherein the secondary obstruction detector comprises an RF motion detector.

11. A method in accordance with claim 1 wherein the modifying is performed when the ascertaining step detects the presence of a secondary obstruction detector and the receiving a second request is received within a predetermined time period.

12. A method in accordance with claim 1 comprising after the step of reversing the modification of the force threshold, modifying the first predetermined threshold by adding an amount representing a second predetermined force to the first predetermined threshold.

13. A method in accordance with claim 12 comprising storing the modified first predetermined threshold as the first predetermined threshold for future performances of the first measuring step.

14. A method in accordance with claim 1 comprising reversing the direction of barrier movement in response to the second measuring step and permitting the use of a force threshold which represents greater force than the higher force threshold for future measuring steps.

15. A method of operating a barrier movement operator for moving a barrier between open and closed positions comprising:
receiving a first request to move a barrier;
measuring the actual force required to move the barrier to detect an obstruction to barrier movement by comparing the measured actual force and a predetermined force threshold;
responsive to the detection of an obstruction, changing the travel of the barrier and modifying the operation of the barrier movement operator, by permitting the use of a higher force threshold in future measuring steps;
generating a number representing the elapsed time since the detection of an obstruction; and
removing the permission of higher force when the elapsed time represented by the generated number exceeds a predetermined amount such that after removal of the permission, future measuring steps will compare measured actual forces with the predetermined force threshold.

16. A method in accordance with claim 15 comprising receiving a second request to move the barrier after the first request and second measuring the actual force required to move the barrier to detect an obstruction to barrier movement.

17. A method in accordance with claim 16 wherein the second measuring step compares the measured actual force with a force threshold created in response to the generated number.

18. A method in accordance with claim 17 wherein the movable barrier operator comprises a wire connected wall control and the step of receiving a second request to move the barrier comprises receiving the second request from the wire connected wall control.

19. A method in accordance with claim 17 wherein the movable barrier comprises a wire connected wall control and a wireless control and the step of receiving a second request to move the barrier comprises receiving a second request from either the wire connected wall control or the wireless control.

20. A method in accordance with claim 15 comprises ascertaining whether a secondary obstruction detector is present in the barrier movement operator and performing the permitting of the higher force threshold in response to the ascertaining step.

21. A method in accordance with claim 20 wherein the permitting of the higher force threshold is performed when the ascertaining step detects the presence of a secondary obstruction detector.

22. A method in accordance with claim 21 wherein the secondary obstruction detector comprises an optically responsive apparatus.

23. A method in accordance with claim 22 wherein the optically responsive device comprises an infrared beam device.

24. A method in accordance with claim 22 wherein the optically responsive detector comprises an optical motion detector.

25. A method in accordance with claim 21 wherein the secondary obstruction detector comprises an acoustic motion detector.

26. A method in accordance with claim 21 wherein the secondary obstruction detector comprises an RF motion detector.

27. A method in accordance with claim 15 comprising:
after the step of reversing the permission of the higher force threshold, modifying the first predetermined threshold by adding an amount representing a second predetermined force to the first predetermined threshold.

28. A method in accordance with claim 27 comprising:
storing the modified first predetermined threshold as the first predetermined threshold for future performances of the first measuring step.

29. A method in accordance with claim 16 comprising:
reversing the direction of barrier movement in response to the second measuring step and permitting the use of a force threshold which represents greater force than the higher force threshold for future measuring steps.

* * * * *